Patented July 10, 1934

1,966,419

UNITED STATES PATENT OFFICE 1,966,419

PRODUCTION OF HYDRAULIC CEMENT

Carl Pontoppidan, Holte, Denmark, assignor to F. L. Smidth & Co., New York, N. Y., a corporation of New Jersey No Drawing. Application December 1, 1931, Serial No. 578,413. In Great Britain June 30, 1931

1 Claim. (Cl. 106—25)

In recent years hydraulic cements have been developed which combine with rapid hardening a capacity for setting in about the same time as normal Portland cement. Such cements have had a high hydraulic modulus (more than 2.20) with a silica modulus of less than 3.0. The hydraulic modulus is the ratio between the basic and acid substances, namely, the ratio by percentage of the calcium oxide to the total amount of silica, aluminium oxide and ferric oxide, and the silica modulus is the ratio by percentage of the silica to the total amount of aluminium oxide and ferric oxide. With a high hydraulic modulus, the large amount of the base (calcium oxide) serves to make the cement quick hardening.

In the hydraulic cements mentioned very fine grinding of the raw materials is essential as with grinding to the degree of fineness commonly used for ordinary Portland cement, the cement is unsound because complete combination of the lime with the acid elements does not take place.

The fine grinding of the raw materials is costly, as in many cases it has been found necessary to use from fifty to one hundred per cent more horsepower in the grinding of the raw materials for a cement with the moduli stated above than would be necessary for an ordinary Portland cement with a lower lime content.

Extensive researches have now shown, however, that while grinding the raw materials only to the degree of fineness commonly used for normal Portland cement, a cement can be obtained from which there can be produced a resultant concrete having the required properties of soundness, early hardening and final strength.

According to the present invention this result is obtained by providing in the mixture of raw materials a proportion of calcareous materials in excess of the saturation point of the argillaceous materials and then grinding the raw materials coarsely, that is, to the degree of fineness commonly used for normal Portland cement, the free lime being converted to hydroxide after burning the clinker partly or wholly during or after the subsequent grinding of the clinker cement. Through such procedure the finished product as compared with Portland cement heretofore produced is characterized by the content of calcium hydroxide and despite the original content of calcium oxide above the saturation point is a sound cement.

By saturation point, as employed in this specification, is understood the point at which there is "a complete conversion of the components to forms containing the highest proportions of lime, that is, to tricalcium silicate, tricalcium aluminate, and tetracalcium alumino ferrite".

The method of calculation of the forms of the components as referred to above is fully set forth in the "calculation of the compounds in Portland cement" by R. H. Bogue, on pages 192–196, of the "Analytical Edition" of "Industrial and Engineering Chemistry", Vol. I, No. 4, Oct. 15, 1929.

"Soundness of cement", as that term is employed in the industry, is that condition of cement which answers to the definition of soundness as found on page 3, of Part II, of the book "A. S. T. M. Standards", published by the American Society for Testing Materials, 1933, as follows:

"A pat of neat cement shall remain firm and hard, and show no signs of distortion, cracking, checking or disintegration in the steam test for soundness."

The conversion of the excess lime is preferably effected by slaking it to calcium hydroxide by means of steam or atomized water vapour.

As far as known, however, cement having a high lime content, that is, having an hydraulic modulus of more than about 2.20 and a silica modulus of less than about 3.0 has never been so treated as to convert the excess lime and it has never been realized that, by deliberately starting with a lime content in the raw materials above the saturation point, grinding the raw materials merely to the ordinary degree of fineness and, after burning, slaking the excess lime, a cement having extremely advantageous properties can be obtained. This may be explained thus: Assuming that a cement contains 66% of lime and that the cement is sound, as the raw materials have been ground sufficiently fine, the soundness of the cement indicates that the basic element in the cement has been substantially completely combined leaving little or no free lime.

In order to make a cement with an equal amount of combined lime according to the present invention the lime content is at first increased to, for example, 68% and the raw materials are not ground to any high degree of fineness; the amount of combined lime remains about the same, as at all points, at which combination takes place, more lime is present than would be the case with a cement having a lower lime content. The additional small amount of free lime is sufficient to make the cement unsound, but after substantially all of it has been converted into calcium hydroxide (that is, without carbonation) it has no deleterious effect on the cement.

In carrying the invention into effect the argillaceous and calcareous raw materials are mixed together, with an excess of calcareous material above the saturation point for the argillaceous material, whereby the combination of the calcareous and argillaceous materials in the subsequent burning is promoted, with a residue of free lime content. This mixture is ground to a degree of fineness comparable with that used for normal Portland cement, which is less than that corresponding to the saturation point of the lime content or, what amounts to the same, the lime content is maintained above that corresponding to the saturation point. After burning the resulting clinker is ground, and during or after the grinding the excess lime is reduced, as by treatment with water in a finely divided state as in the form of steam or atomized water so that the free calcium oxide is converted to calcium hydroxide. It will be understood that whether the steam is introduced in the form of steam or in the form of atomized water, the water, by reason of the high temperature developed in the grinding, becomes steam and as steam combines with the lime.

The hydraulic and silica moduli stated above are the correct limits for the cement as produced if water and pure gypsum, either calcined or raw, constitute the only additions. If, however, other substances, such as impure gypsum, silicic acid in some form, Puzzalano or Trass, blast furnace slag or other kinds of slag, limestone, clay, lime or other minerals are to be mixed with the cement, the resultant mixture will have a hydraulic modulus and a silica modulus somewhat different from those stated above, but it will, of course, be understood that such mixtures are within the scope of the present invention.

In addition to the advantageous properties of the cement produced in the manner described the process itself affords the particular advantage that the cost of manufacture is considerably reduced in comparison with that of hydraulic cements of high hydraulic modulus hitherto known.

I claim as my invention:

The process of producing hydraulic cement of the Portland cement type which consists in mixing argillaceous and calcareous raw materials, providing in such mixture calcareous material in excess of the saturation point for the argillaceous material and thereby promoting the reaction of the calcareous and argillaceous materials in the subsequent burning, with a residue of free lime, grinding the mixture to a degree of fineness comparable with that used for Portland cement, burning the mixture, grinding the resultant clinker, and subjecting the finely ground material to the action of steam and thereby converting the residue of free lime to calcium hydroxide.

CARL PONTOPPIDAN.